US007110129B2

(12) United States Patent
Parrish et al.

(10) Patent No.: US 7,110,129 B2
(45) Date of Patent: Sep. 19, 2006

(54) METHOD, SYSTEM, AND PROGRAM FOR RESPONDING TO AN ACKNOWLEDGEMENT REQUEST FROM A PRINTER DRIVER

(75) Inventors: Ronald Dean Parrish, Niwot, CO (US); David Earl Stone, Longmont, CO (US); Timothy Leroy Towns, Longmont, CO (US); John Thomas Varga, Longmont, CO (US); Rose Ellen Visoski, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 09/770,894

(22) Filed: Jan. 26, 2001

(65) Prior Publication Data

US 2002/0101601 A1     Aug. 1, 2002

(51) Int. Cl.
G06F 15/00    (2006.01)
G06K 1/00     (2006.01)
(52) U.S. Cl. .................... 358/1.15; 358/435; 710/19
(58) Field of Classification Search ........ 358/1.11–1.16, 358/1.1, 1.9, 437, 438, 439, 435; 710/19
See application file for complete search history.

(56) References Cited

U.S. PATENT DOCUMENTS

| | | | |
|---|---|---|---|
| 4,651,278 A * | 3/1987 | Herzog et al. ............. 358/1.18 |
| 5,652,711 A | 7/1997 | Vennekens | |
| 5,754,434 A | 5/1998 | Delfer et al. | |
| 5,982,997 A | 11/1999 | Stone et al. | |
| 6,441,919 B1 * | 8/2002 | Parker et al. ............. 358/1.18 |
| 6,549,947 B1 * | 4/2003 | Suzuki ..................... 709/229 |
| 2004/0012807 A1 * | 1/2004 | Konishi ..................... 358/1.15 |

FOREIGN PATENT DOCUMENTS

EP          820004 A1 *    1/1998

OTHER PUBLICATIONS

IBM Corp., "IPDS Error Recovery" [online], Mar. 26, 1999, pp. 1-2, source from *IBM InfoPrint Manager 3.1: Reference*. [Retrieved on Oct. 8, 2001]. Retrieved from the Internet at <URL: http://www.printers.ibm.com/pbin-id/go?/pdocs/ip798/reference/refip7981.html>.

IBM Corp., "IPDS Printer Operator Commands" [online], Apr. 15, 1999, pp. 1-6, source from *IBM InfoPrint Manager 3.1: Reference*. [Retrived on Oct. 8, 2001]. Retrieved from the Internet at <URL: http://www.printer.ibm.com/pbin-id/go?/pdocs/ip798/reference/refip7982.html>.

(Continued)

*Primary Examiner*—Gabriel Garcia
*Assistant Examiner*—Thierry L. Pham
(74) *Attorney, Agent, or Firm*—David W. Victor; Konrad Raynes & Victor LLP

(57) ABSTRACT

Provided is a method, system, and program for interfacing with a printer driver. Data and an acknowledgment request is received from the printer driver. The printer driver does not send further data to print until receiving an acknowledgment reply indicating that the transmitted data passed an initial check to improve printer performance. An acknowledgment reply is transmitted to the printer driver in response to the acknowledgment request before completing the initial check of the sent data to cause the printer driver to send further data. Data processing operations are resynchronized in response to detecting an error in the received data. The received data is rasterized and outputted.

27 Claims, 4 Drawing Sheets

OTHER PUBLICATIONS

IBM Corp., "IPDS Error Recovery: Data Steam Errors" [online], Mar. 26, 1999, pp. 1-4, source from *IBM InfoPrint Manager 3.1: Reference*. [Retrieved on Oct. 8, 2001]. Retrieved from the Internet at <URL: http:///www.printers.ibm.com/pbin-id/go?/pdocs/ip798/reference/refip7981a.html>.

IBM Corp., "Acknowledge Reply", from *Data Stream and Object Architectures, IPDS Reference*, Reference code S544-3417-05, pp. 86-95.

IBM Corp., "Multiprocess Asynchronous IPDS Printer Communications Interface" [online], Nov. 1992, pp. 1-2. Retrieved from the Internet at <URL: http://www.patents.ibm.com/tdbs/tdb?o=92A%2063158>.

* cited by examiner

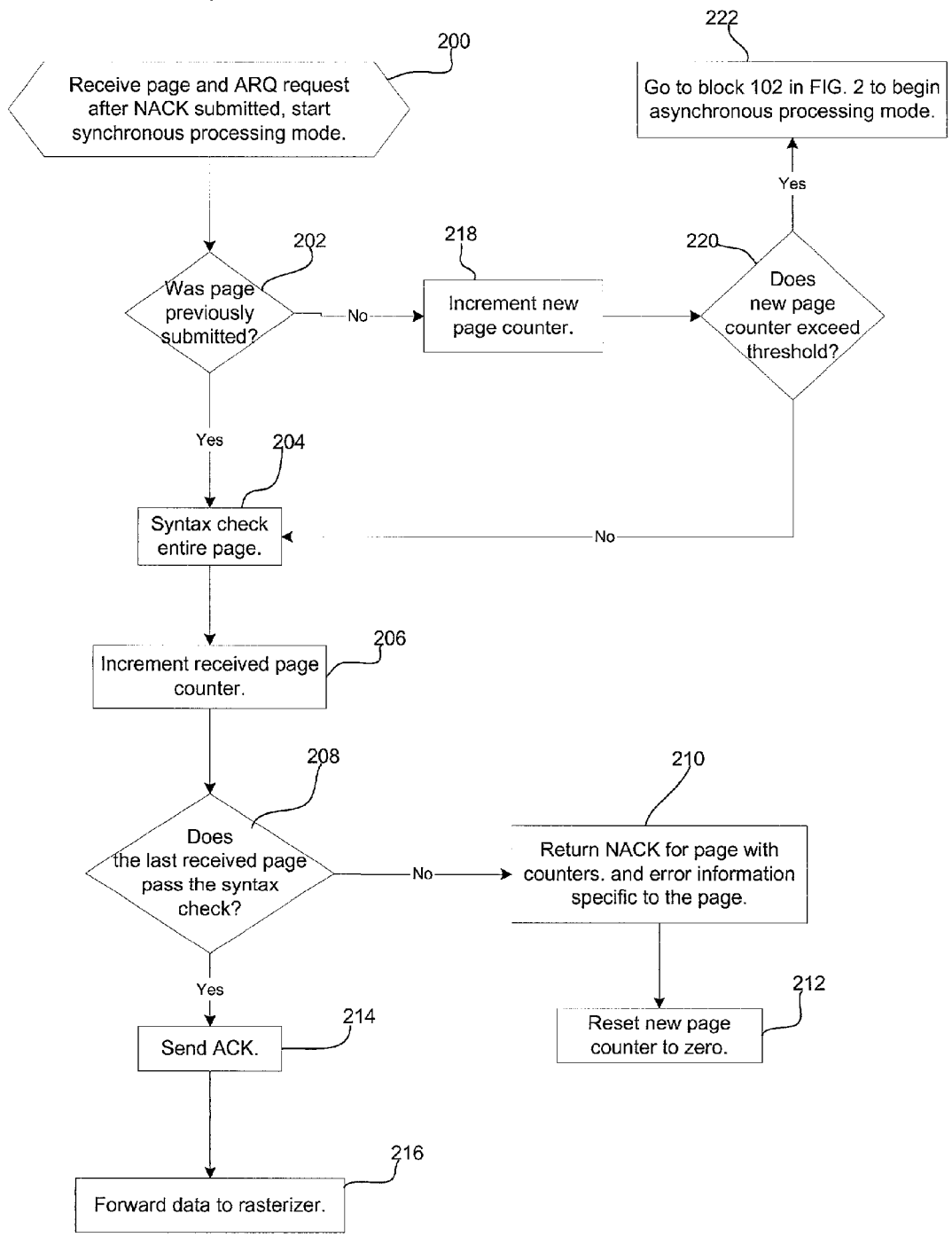

METHOD, SYSTEM, AND PROGRAM FOR RESPONDING TO AN ACKNOWLEDGEMENT REQUEST FROM A PRINTER DRIVER

BACKGROUND OF THE INVENTION

1. Field of the Invention

The present invention relates to a method, system and program for responding to an acknowledgment request from a printer driver to improve printer performance.

2. Description of the Related Art

To print an image, a print engine processor, referred to herein as a rasterizer, converts or rasterizes the image in a page description language or vector graphics format to a printer readable bit mapped image indicating a value to print at each pixel of the image. An application program on a host computer generates a data stream and instantiates a printer driver to transmit the data stream to the printer. The printer then rasterizes and prints the data stream. International Business Machines Corporation (IBM) provides the Intelligent Printer Data Stream (IPDS) printer service that converts a data stream to an IPDS compatible format. This IPDS data stream is then sent to the printer to rasterize and output. The IPDS architecture provides specific commands and status requests. The printer driver may use the IPDS commands to control how the printer rasterizes and prints the data stream as well as monitor printer operations. The IPDS data stream may include different data types, such as text, image, graphics, and bar code.

The IPDS architecture provides an extensive acknowledgment protocol at the data-stream level. This acknowledgment protocol helps synchronize host and printer processes, exchange query-reply information, and return detailed exception information. Details of the IPDS architecture and acknowledgment protocol are described in the IBM publication "Intelligent Printer Data Stream Reference", IBM document no. S544-341705 (Copyright IBM, 6$^{th}$ ed., 1996), which publication is incorporated herein by reference in its entirety.

In prior art IPDS implementations, the printer driver requests acknowledgment (ARQ) from the printer. To return acknowledgment, the printer must complete a syntax check of the received page and return an acknowledgment reply (ACK) in order to receive the next page from the printer driver on the host computer. If the printer receives a command requesting acknowledgment (ARQ), and if this command also requests specific printer information, then the printer sends an ACK that contains page and copy counters and the requested information in the data-field portion of the ACK. The page and copy counters may include a received page counter indicating the number of pages the printer has received from the printer driver and a stacked page counter indicating the number of pages successfully stacked, i.e., printed. Other counters may also be used to track the movement of pages and copies of pages through the printer for queue management and exception recovery. If the printer generates the acknowledge reply (ACK) as a result of detecting an exception, the printer sends a negative acknowledgment (NACK). This exception information is stored in a special data area of the NACK. Page and copy counters are also returned in the data-field portion of the NACK.

One dilema with the current acknowledgment reply protocol is that the printer driver will not provide further pages until receiving a positive acknowledgement reply (ACK). In this way, the printer driver ensures that that all paths of execution are synchronized at the point of last command sent as of the acknowledgment request (ARQ). This means that the printer upon receiving an acknowledgment request (ARQ) is idle between the time that it completes rasterizing a page and receives the next page from the printer driver. Further, the printer cannot rasterize pages in parallel because the printer driver does not provide an additional page for the parallel operation until the acknowledgment reply (ACK) is received.

In the prior art, to avoid idle time, an ACK-INTERVAL is used to instruct the printer driver of how many pages to wait before submitting a next acknowledgment request (ARQ). The ACK-INTERVAL value is specified in terms of pages, e.g., 100, 200, 300, etc. A longer ACK-INTERVAL reduces the idle time because relatively more pages are fed to the printer before the next acknowledgment request. Thus, pages are buffered in the printer waiting to be rasterized. However, because status information is provided less frequently with the longer ACK-INTERVAL, the printer driver must buffer more sent pages because the status information provided in the acknowledgment reply (ACK) is used to determine which previously sent pages no longer need to be buffered. Once a page is successfully printed, the printer driver no longer needs to buffer the data. On the other hand, a smaller ACK-INTERVAL provides more frequent status information thereby allowing the printer driver to remove buffered pages more frequently, which reduces the size of the buffer needed by the printer driver. However, a smaller ACK-INTERVAL increases the frequency of the acknowledgment requests, thereby increasing communication and increasing the number of idle periods at the printer.

Thus, there is a need in the art for an improved acknowledgment protocol between a printer driver and printer that reduces idle time at the printer and at the same time minimizes the number of pages the printer driver must buffer between acknowledgment replies (ACK).

SUMMARY OF THE PREFERRED EMBODIMENTS

Provided is a method, system, and program for interfacing with a printer driver. Data and an acknowledgment request is received from the printer driver. The printer driver does not send further data to print until receiving an acknowledgment reply indicating that the transmitted data passed an initial check. An acknowledgment reply is transmitted to the printer driver in response to the acknowledgment request before completing the initial check of the sent data to cause the printer driver to send further data. Data processing operations are resynchronized in response to detecting an error in the received data. The received data is rasterized and outputted.

In further implementations, the received data comprises a first received data set. A second data set is received from the printer driver after transmitting the acknowledgment reply and before rasterizing the first data set.

In yet further implementations, each received data set comprises a page of data to output. In such case, the second data set is buffered while the first data set is being rasterized and the buffered second data set is rasterized after completing the rasterization of the first data set. Alternatively, the first and second data sets may be concurrently rasterized in parallel with two rasterizers.

Still further, an error is detected while processing the received data. A negative acknowledgment is transmitted to the printer driver indicating an error that causes the printer driver to resend previously transmitted data that did not output successfully. After transmitting the negative acknowledgment, data and one acknowledgment request are received. The initial check of the received data is performed and a determination is made of whether the received data is resent data. If the received data is resent data, then an acknowledgment reply is transmitted to the printer driver in response to the acknowledgment request after completing the initial check of the resent data.

Preferred embodiments provide an acknowledgment reply protocol to optimize printer throughput and performance when a printer driver requires a positive acknowledgment that an initial check, e.g., syntax check, etc., has been performed before transmitting a next page to the printer. Preferred embodiments cause the printer to asynchronously send pages even before the required initial check has been performed to buffer pages at the printer to avoid idle time and allow for parallel rasterization of data. Further, preferred embodiments provide highly frequent status to the printer driver to allow the printer driver to frequently determine outputted pages that no longer need to be buffered.

BRIEF DESCRIPTION OF THE DRAWINGS

Referring now to the drawings in which like reference numbers represent corresponding parts throughout:

FIG. 4 illustrates logic implemented in the printer interface to process a page after transmitting a negative acknowledgment.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
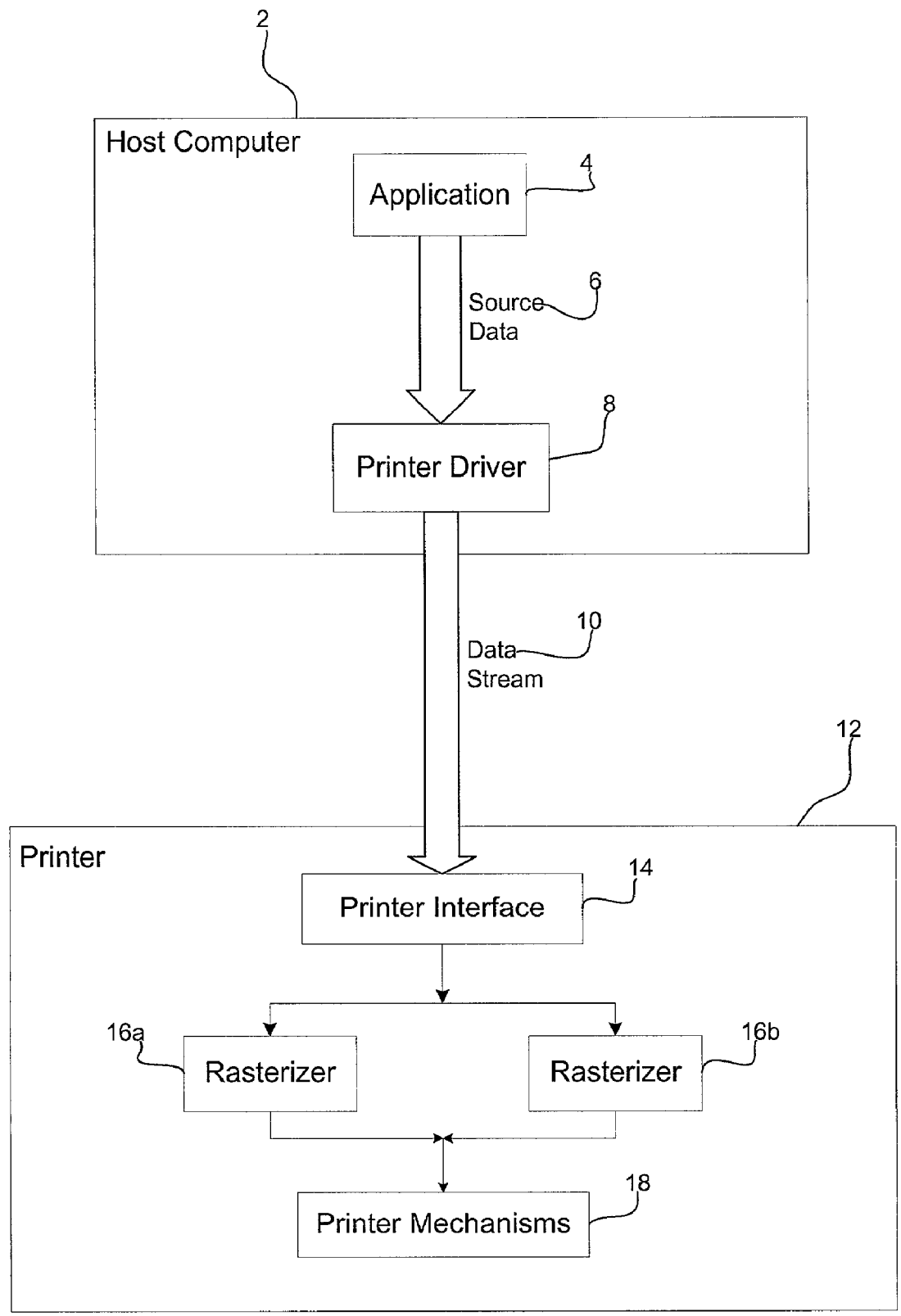
FIG. 1 illustrates a printing architecture used by certain implementations.

FIG. 1 illustrates a printing environment in which preferred embodiments are implemented. A host computer 2 includes an application 4 that generates source data 6 for a printer, that may include text, images, graphics, etc. A printer driver 8 converts the source data 6 into a data stream 10 that is transmitted to a printer 12. A printer interface 14 within the printer 12 is capable of processing the data stream 10, commands and status requests from the printer driver 8. The printer interface 14 then transmits parts of the data stream to rasterizers 16a, b that, in parallel, transform the data stream 10 to a printable format. The output of the rasterizers 16a, b is then sent to the printer mechanism 18, which includes the rollers as well as ink dispenser, e.g., laser jet, ink jet, etc.

The application 4 and printer driver 8 may be implemented as software programs that execute within the host computer 2 memory. The printer driver 8 may include an IBM presentation services component that is capable of converting a source data stream to an IPDS data stream in implementations where the data stream 10 comprises an IPDS data stream. The printer interface 14 may be implemented as a software program executed by the printer 12 processor that is capable of supporting the printer communication protocol used by the printer driver 8, such as the IPDS printer protocol. The rasterizers 16a, b may be implemented as software executed by the printer 12 process within the printer 12 memory, e.g., RAM. Alternatively, the rasterizers 16a, b may comprise hardware rasterizers implemented in an integrated circuit, such as an application specific integrated circuit (ASIC), Field Programmable Gate Array (FPGA), etc. In preferred embodiments, there are at least two rasterizers 16a, b capable of parallel processing different parts of the data stream 10, such as different pages in the data stream to increase the throughput to the printer mechanisms 18. In alternative embodiments, there may only be one rasterizer to rasterize one page at-a-time. The printer driver 8 transmits the data stream 10 to the printer interface 14 via a network connection or through a serial or parallel port, or channel interface.

Figure 2:
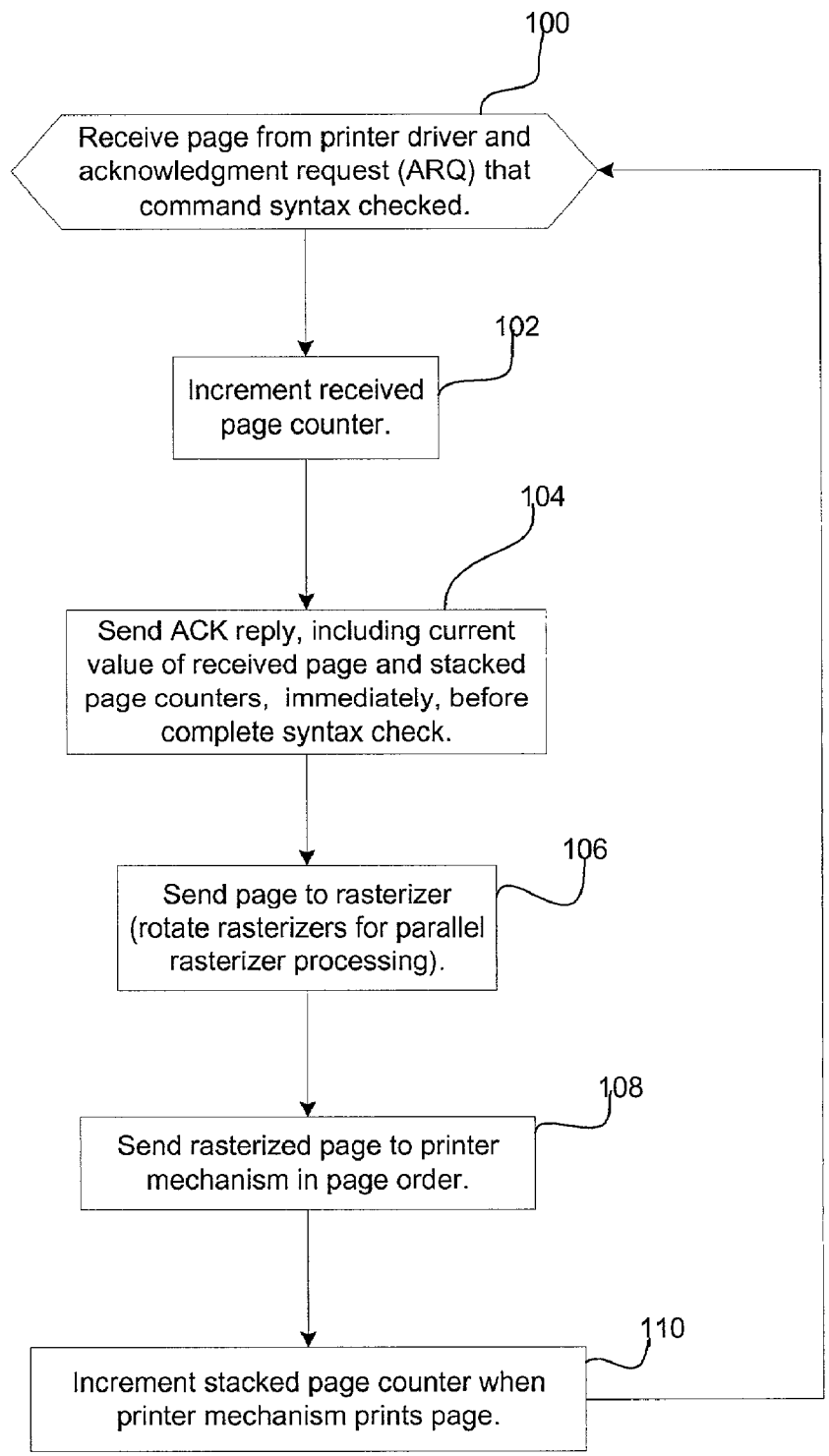
FIG. 2 illustrates logic implemented in a printer interface to process a page and acknowledgment request received from a printer driver.

FIG. 2 illustrates logic implemented in the printer interface 14 to receive continuous pages from the printer driver 8 before returning an acknowledgment reply (ACK) that the data stream has been syntax checked. Control begins at block 100 with the printer interface 14 receiving a page from the printer driver 8 and an acknowledgment request (ARQ) from the printer driver 8. The printer driver 8 requires acknowledgment that the printer 12 has received, accepted and syntax-checked the data stream for processing as of the last sent command before transmitting the next page. The printer interface 14 increments (at block 102) the received page counter. The printer interface 14 then sends (at block 104) an acknowledgment reply (ACK) that the data stream was syntax checked. The ACK reply includes the received and stacked page counters. Other counters and data may be provided with the ACK. In this way, the printer interface 14 returns the ACK reply before actually having performed the syntax checking and initial processing of the page. This causes the printer driver 8 to send multiple pages before such pages have been initially processed and synchronized as of the last command. In this way, multiple pages are provided to the rasterizers 16a, b to process concurrently. Alternatively, if there is only one rasterizer, then sending multiple pages allows pages to be buffered at the printer 12 for immediate feeding to the sole rasterizer after completing rasterizing the current page to avoid any idle time at the rasterizers. The preferred embodiment algorithm for responding to the acknowledgment request (ARQ) improves the throughput of the printer 12 to the printer mechanism 18 when the printer driver 8 requires synchronization and acknowledgment before providing a next page in the data stream.

After sending the ACK reply (at block 104), the printer interface 14 transmits the received page to an available rasterizer 16a, b. The printer interface 14 would distribute pages to the rasterizers 16a, b to process pages in parallel. After rasterizing, the rasterizers 16a, b transmit (at block 108) the rasterized pages to the printer mechanism 18 to render according to the page sequence or ordering in the data stream 10. After successfully printing the page, a stacked page counter is incremented (at block 110).

Figure 3:
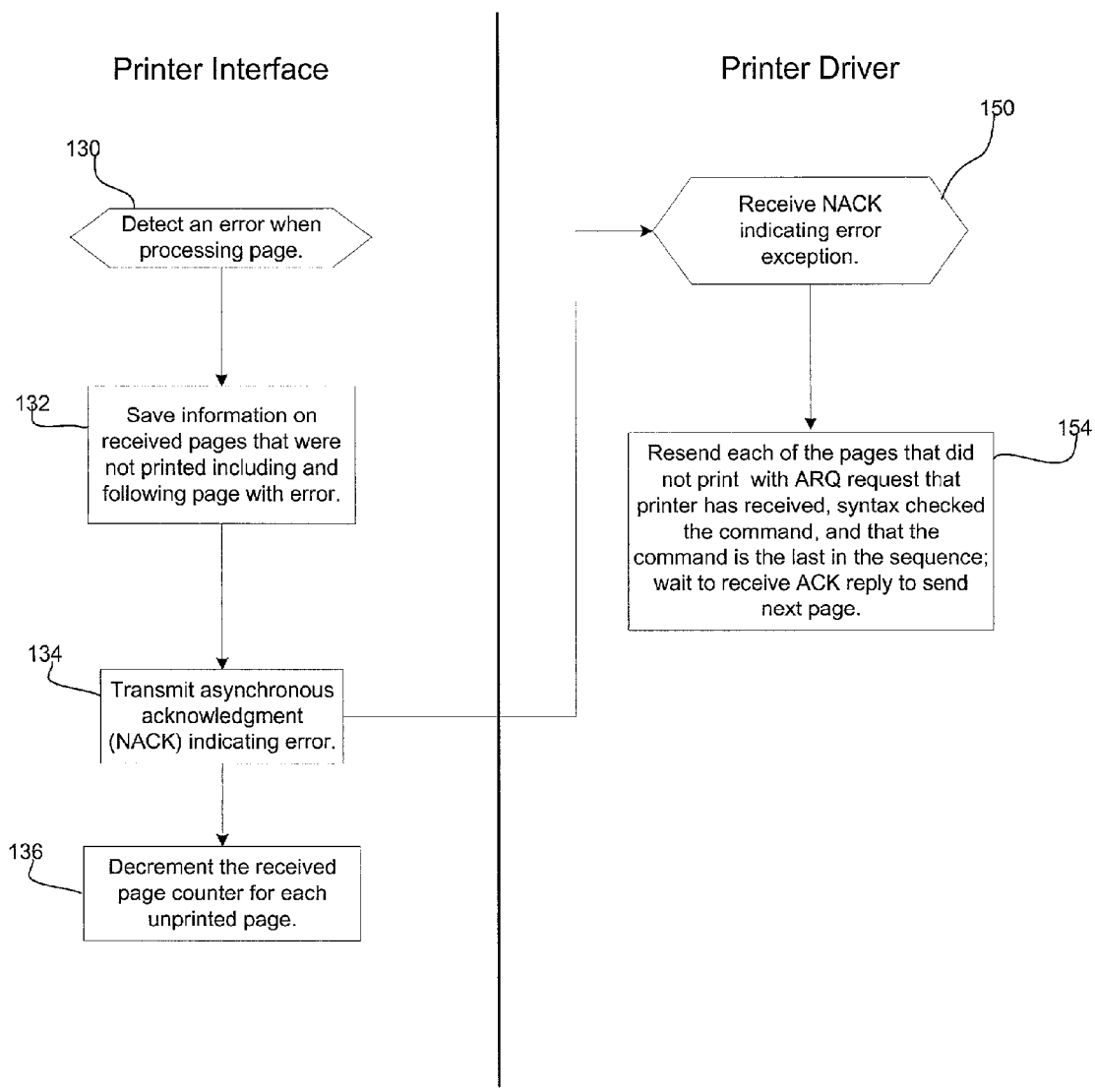
FIG. 3 illustrates logic implemented in the printer interface and printer driver to handle an error in processing the page at the printer.

At block 130 in FIG. 3, the printer interface 14 detects an exception or printing error when processing the page. In response, the printer interface 14 saves (at block 132) information on the received pages at the printer 12 that were not printed, including the page with the error that caused the exception. The printer interface 14 then transmits (at block 134) a negative acknowledgment (NACK) as an asynchronous exception. In preferred embodiments, the NACK could indicate that the data is corrupted or other error message to cause the printer driver 8 to resend the pages. The received page counter is decremented (at block 136) for each page not printed.

In response to receiving (at block 150 in FIG. 3) the NACK indicating an error exception, the printer driver 8 determines the number of sent pages that did not print. Because the printer 12 will not process pages after detecting an error, the printer driver 8 is assured that the number of sent pages that did not print were the most recently sent pages. The printer driver 8 then resends (at block 154) each of the pages that were previously sent and did not print, i.e., were not stacked. When sending each page, the printer driver 8 transmits an acknowledgment request (ARQ) and does not send a next page until receiving an acknowledgment reply (ACK) from the printer interface 14.

FIG. 4 illustrates logic implemented in the printer interface 14 to process pages in synchronous mode sent after transmitting a NACK to the printer driver 8. At block 200, the printer interface 14 receives a page and acknowledgment request (ARQ) from the printer driver 8 after it transmitted a NACK at block 132. If (at block 202) the received page was previously submitted, then the printer interface 14 performs (at block 204) initial condition checking for the page, which may include syntax and other exception checking. As discussed, when sending the NACK, the printer interface 14 saves information on each received page that did not print. The printer interface 14 then increments (at block 206) the received page counter. If (at block 208) the last received group of commands does not pass the initial condition checking, such as the syntax check, then the printer interface 14 returns (at block 210) a NACK for the page with counters and error information indicating detected errors with the page that failed to print. The new page counter is then set (at block 212) to zero. Otherwise, if the page passed the syntax and initial checking, then acknowledgment (ACK) is sent (at block 214). The checked data is then sent (at block 216) to the rasterizer.

If (at block 202) the received page was not previously sent and did not have detected errors, then a new page counter is incremented (at block 218) indicating the number of new pages sent after the printer driver 8 has sent all resent pages. If (at block 220) the new page counter exceeds a threshold, then control transfers (at block 222) to block 102 in FIG. 2 to begin processing further received pages in asynchronous mode. In this way, the printer driver 8 processes all resent pages and a threshold number of new pages not previously sent in synchronous mode where an acknowledgment reply is sent after a page has completed the initial check. After processing the threshold number of error-free new pages in synchronous mode, the printer interface 14 then switches to the asynchronous mode to cause the printer driver 8 to send the next page before the initial checking has completed.

In the above implementation, when processing pages in synchronous mode after detecting an error, the printer interface 14 does not know whether a page sent by the printer driver 8 is a resent page or a new page. However, many printer drivers 8 are designed to not resend a page that printed properly, so the printer interface 14 does not expect the printer driver 8 to resend pages that printed successfully. Before sending the NACK, the printer interface 14 determines the number of pages that were "sent but not printed", as the received pages minus the stacked pages. In synchronous mode, the printer interface 14 assumes that the first pages sent by the printer driver 8 equal to the number of pages "sent but not printed" are resent pages. Pages sent by the printer driver 8 in synchronous mode following the number of pages "sent but not printed" are assumed to be new pages. This is one technique the printer interface 14 can use at block 202 to determine whether a page was previously submitted or resent. In this way, the printer interface 14 remains in synchronous processing mode for the number of pages "sent but not printed" plus the threshold number.

Note that the use of the threshold reduces thrashing between asynchronous and synchronous nodes as the processing does not switch from synchronous to asynchronous unless a predetermined number of error-free pages have been received. If this threshold was not used, then receiving one error page following an error-free page could cause a thrashing between asynchronous and synchronous processing.

If an error is detected during synchronous processing of the resent page, then the printer interface 8 returns a NACK in a manner known in the art, including specific error information on the page. In synchronous mode, the printer interface 8 is capable of detecting the specific cause of the error in a manner known in the art and return information on the cause of the error in the page as well as counter values to the printer driver 8. The printer driver 8 can request further error information in an error recovery mode.

With the preferred embodiments, during asynchronous processing mode, the printer driver 8 believes that all the initial checking was completed upon receiving the acknowledgment reply (ACK) and sends the next page to allow the printer 12 to accumulate and buffer multiple pages. In this way, the pages buffered at the printer 12 are available for parallel processing at the multiple rasterizers 16*a*, *b*. Further, the preferred embodiments ensure that pages are always available for further processing in the printer 12 to avoid any idle times at the rasterizer 16*a*, *b*.

In preferred embodiments, the printer driver 8 receives an acknowledgment reply (ACK) after sending each page that includes a stacked page counter value indicating the number of pages that have been outputted, i.e., stacked. These counter values allow the printer driver 8 to determine completed pages that can be removed from the buffer. In fact, with preferred embodiments, completed pages are removed from the printer driver 12 buffer as soon as possible because in preferred embodiments the printer driver 8 receives continual acknowledgment and indication of completed pages at the most frequent rate, i.e., after sending each page (an ACK-INTERVAL of one page). This reduces the buffer size used by the printer driver 12 because pages are removed from the printer driver buffer 12 at the highest frequency rate. In alternative embodiments, the ACK-INTERVAL may be greater than one, thereby reducing the frequency that the printer driver 8 receives status on the completed pages.

With preferred embodiments, the printer interface 14 is able to receive and buffer pages before completing the initial syntax checking to avoid idle times and allow parallel page processing while also providing the printer driver 8 immediate status information at the most frequent rate, i.e., after each page. This is an improvement over prior art acknowledgment systems where a tradeoff must be made between providing frequent status to the printer driver and feeding the printer interface a continuous flow of pages to minimize idle time and allow parallel processing. With preferred embodiments, no such tradeoff is necessary as the preferred embodiment acknowledgment methodology allows both status to be delivered to the printer driver 8 at the highest frequency rate and provides a continuous supply of pages in a manner that minimizes idle time and allows parallel processing.

The following describes alternatives for the above described implementations of the preferred embodiments.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In preferred embodiments, the ARQ reply is sent in response to requests for page status. However, for certain types of print driver resource requests, the printer interface would not want to provide an asynchronous ARQ reply. For instance, if the print driver requests to add or delete printer resources, such as fonts, overlays, page segments, images loaded into the printer for later use, etc., then the printer interface will only return status after the status of the resource is properly determined to allow for error reporting. Such information is necessary in order for the printer driver to function properly and avoid causing problems at the host. Further, if a page is received followed by a request to load or delete a resource, and then an ACK request is received, then the printer interface may not return an asynchronous ACK. Instead, in such cases, ARQ status will not be returned until the status of the resource is fully ascertained to allow any error reporting on the resource if necessary, even if pages were are also sent.

In preferred embodiments, the rasterized data is sent to a printer mechanism 18 to generate print output. However, in alternative embodiments the raster objects may provide output data for another device, such as a display monitor, a storage device for future rendering, etc.

In the described embodiments, the printer driver 8 acknowledgment request (ARQ) sent after the page is sent is used to determine whether the previously sent page or data stream has been syntax checked for various conditions. The printer driver 8 does not send further pages or data until receiving acknowledgment (ACK) that the page was successfully checked for these initial conditions, such as syntax checking. In further embodiments, the initial checking may involve checking the data stream for other exception and error conditions in addition to those described herein, such as decompression errors or deficiencies in storage capacity related errors.

In preferred embodiments, two different pages are concurrently rasterized by two different rasterizers 16a, b. In alternative embodiments, a single rasterizer can multiplex the rasterization of two pages or more than two rasterizers may be used.

In preferred embodiments, the printer driver 8 sends pages of data to the printer 12. In alternative embodiments, other units of data may be sent, such as objects, chapters, commands, etc., instead of pages.

In preferred embodiments, the printer driver and printer interface are located on separate machines. In alternative embodiments, the printer driver and printer interface may be located on the same machine.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interfacing with a printer driver, comprising:
    receiving data transmitted from the printer driver;
    receiving an acknowledgment request from the printer driver, wherein the printer driver does not send further data to print until receiving an acknowledgment reply indicating that the transmitted data passed an initial check;
    transmitting an acknowledgment reply to the printer driver in an asynchronous processing mode in response to the acknowledgment request before completing the initial check of the sent data to cause the printer driver to send further data;
    resynchronizing data processing operations in response to detecting an error in the received data by beginning a synchronous processing mode in which the acknowledgment reply is sent to the printer driver in response to the acknowledgment request after completing the initial check of the resent data; and
    rasterizing and outputting the data.

2. The method of claim 1, wherein the received data comprises a first received data set, further comprising receiving a second data set from the printer driver after transmitting the acknowledgment reply and before completing the rasterization of the first data set.

3. The method of claim 2, wherein each received data set comprises a page of data, a portion of a page or commands to output.

4. The method of claim 2, further comprising:
    buffering the second data set while the first data set is being rasterized; and
    rasterizing the buffered second data set after completing the rasterization of the first data set.

5. The method of claim 2, further comprising:
    concurrently rasterizing the first and second data sets with two rasterizers to rasterize in parallel the two data sets.

6. The method of claim 1, wherein the initial check is to verify that the data was received, accepted and syntax checked.

7. A method for interfacing with a printer driver, comprising:
    receiving data transmitted from the printer driver;

receiving an acknowledgment request from the printer driver, wherein the printer driver does not send further data to print until receiving an acknowledgment reply indicating that the transmitted data passed an initial check;

transmitting an acknowledgment reply to the printer driver in response to the acknowledgment request before completing the initial check of the sent data to cause the printer driver to send further data;

detecting an error while processing the received data;

transmitting a negative acknowledgment indicating an error that causes the printer driver to resend previously transmitted data that did not output successfully; and wherein after transmitting the negative acknowledgment, performing:
  (i) receiving data and one acknowledgment request;
  (ii) performing the initial check of the received data;
  (iii) determining whether the received data is resent data; and
  (iv) if the received data is resent data, then transmitting an acknowledgment reply to the printer driver in response to the acknowledgment request after completing the initial check of the resent data; and
rasterizing and outputting the data.

8. The method of claim 7, wherein the received data comprises a page of data, wherein after transmitting the negative acknowledgment, further performing:
  if the received page is not a resent page, then transmitting an acknowledgment reply to the printer driver in response to the acknowledgment request before completing the initial check of the sent data to cause the printer driver to send further pages.

9. The method of claim 8, wherein after transmitting the negative acknowledgment, further performing:
  incrementing a counter if the received page is not a resent page;
  determining whether the counter exceeds a threshold;
  wherein if the received page is not a resent page, then, if the counter does not exceed the threshold, transmitting the acknowledgment reply to the printer driver after completing the initial check of the page and if the counter does exceed the threshold, then transmitting the acknowledgment reply to the printer driver before completing the initial check of the page.
  means for resynchronizing data processing operations in response to detecting an error in the received data; and
  means for rasterizing and outputting the data.

10. A system for interfacing with a printer driver, comprising:
  means for receiving data transmitted from the printer driver;
  means for receiving an acknowledgment request from the printer driver, wherein the printer driver does not send further data to print until receiving an acknowledgment reply indicating that the transmitted data passed an initial check;
  means for transmitting an acknowledgment reply to the printer driver in an asynchronous processing mode in response to the acknowledgment request before completing the initial check of the sent data to cause the printer driver to send further data;
  means for resynchronizing data processing operations in response to detecting an error in the received data by beginning a synchronous processing mode in which the acknowledgment reply is sent to the printer driver in response to the acknowledgment request after completing the initial check of the resent data; and
  means for rasterizing and outputting the data.

11. The system of claim 10, wherein the received data comprises a first received data set, further comprising means for receiving a second data set from the printer driver after transmitting the acknowledgment reply and before completing the rasterization of the first data set.

12. The system of claim 11, wherein each received data set comprises a page of data, a portion of a page or commands to output.

13. The system of claim 11, further comprising:
  means for buffering the second data set while the first data set is being rasterized; and
  means for rasterizing the buffered second data set after completing the rasterization of the first data set.

14. The system of claim 11, further comprising:
  means for concurrently rasterizing the first and second data sets with two rasterizers to rasterize in parallel the two data sets.

15. The system of claim 10, wherein the initial check is to verify that the data was received, accepted and syntax checked.

16. A system for interfacing with a printer driver, comprising:
  means for receiving data transmitted from the printer driver;
  means for receiving an acknowledgment request from the printer driver, wherein the printer driver does not send further data to print until receiving an acknowledgment reply indicating that the transmitted data passed an initial check;
  means for transmitting an acknowledgment reply to the printer driver in response to the acknowledgment request before completing the initial check of the sent data to cause the printer driver to send further data;
  means for detecting an error while processing the received data;
  means for transmitting a negative acknowledgment indicating an error that causes the printer driver to resend previously transmitted data that did not output successfully; and
  means for performing, after transmitting the negative acknowledgment:
    (i) receiving data and one acknowledgment request;
    (ii) performing the initial check of the received data;
    (iii) determining whether the received data is resent data; and
    (iv) if the received data is resent data, then transmitting an acknowledgment reply to the printer driver in response to the acknowledgment request after completing the initial check of the resent data; and
  means for rasterizing and outputting the data.

17. The system of claim 16, wherein the received data comprises a page of data, further comprising means for performing after transmitting the negative acknowledgment:
  if the received page is not a resent page, then transmitting an acknowledgment reply to the printer driver in response to the acknowledgment request before completing the initial check of the sent data to cause the printer driver to send further pages.

18. The system of claim 17 further comprising means for performing, after transmitting the negative acknowledgment:
  incrementing a counter if the received page is not a resent page;
  determining whether the counter exceeds a threshold;
  wherein if the received page is not a resent page, then, if the counter does not exceed the threshold, transmitting the acknowledgment reply to the printer driver after completing the initial check of the page and if the counter does exceed the threshold, then transmitting the acknowledgment reply to the printer driver before completing the initial check of the page.

19. An article of manufacture for interfacing with a printer driver, wherein the article of manufacture comprises code implemented in a computer readable medium to cause a processor to perform:

receiving data transmitted from the printer driver;

receiving an acknowledgment request from the printer driver, wherein the printer driver does not send further data to print until receiving an acknowledgment reply indicating that the transmitted data passed an initial check;

transmitting an acknowledgment reply to the printer driver in an asynchronous processing mode in response to the acknowledgment request before completing the initial check of the sent data to cause the printer driver to send further data;

resynchronizing data processing operations in response to detecting an error in the received data by beginning a synchronous processing mode in which the acknowledgment reply is sent to the printer driver in response to the acknowledgment request after completing the initial check of the resent data; and rasterizing and outputting the data.

20. The article of manufacture of claim 19, wherein the received data comprises a first received data set, wherein the code is further capable of causing the processor to perform receiving a second data set from the printer driver after transmitting the acknowledgment reply and before completing the rasterization of the first data set.

21. The article of manufacture of claim 20, wherein each received data set comprises a page of data, a portion of a page or commands to output.

22. The article of manufacture of claim 20, wherein the code is further capable of causing the processor to perform:

buffering the second data set while the first data set is being rasterized; and rasterizing the buffered second data set after completing the rasterization of the first data set.

23. The article of manufacture of claim 20, wherein the code is further capable of causing the processor to perform:

concurrently rasterizing the first and second data sets with two rasterizers to rasterize in parallel the two data sets.

24. The article of manufacture of claim 19, wherein the initial check is to verify that the data was received, accepted and syntax checked.

25. An article of manufacture for interfacing with a printer driver, wherein the article of manufacture comprises code implemented in a computer readable medium to cause a processor to perform:

receiving data transmitted from the printer driver;

receiving an acknowledgment request from the printer driver, wherein the printer driver does not send further data to print until receiving an acknowledgment reply indicating that the transmitted data passed an initial check;

transmitting an acknowledgment reply to the printer driver in response to the acknowledgment request before completing the initial check of the sent data to cause the printer driver to send further data;

detecting an error while processing the received data;

transmitting a negative acknowledgment indicating an error that causes the printer driver to resend previously transmitted data that did not output successfully; and wherein after transmitting the negative acknowledgment the code is further capable of causing the processor to perform:

(i) receiving data and one acknowledgment request;

(ii) performing the initial check of the received data;

(iii) determining whether the received data is resent data; and (iv) if the received data is resent data, then transmitting an acknowledgment reply to the printer driver in response to the acknowledgment request after completing the initial check of the resent data; and rasterizing and outputting the data.

26. The article of manufacture of claim 25, wherein the received data comprises a page of data, wherein after transmitting the negative acknowledgment, further performing:

if the received page is not a resent page, then transmitting an acknowledgment reply to the printer driver in response to the acknowledgment request before completing the initial check of the sent data to cause the printer driver to send further pages.

27. The article of manufacture of claim 26, wherein the code is further capable of causing the processor to perform after transmitting the negative acknowledgment:

incrementing a counter if the received page is not a resent page;

determining whether the counter exceeds a threshold;

wherein if the received page is not a resent page, then, if the counter does not exceed the threshold, transmitting the acknowledgment reply to the printer driver after completing the initial check of the page and if the counter does exceed the threshold, then transmitting the acknowledgment reply to the printer driver before completing the initial check of the page.

* * * * *